(12) United States Patent
Dworakowski et al.

(10) Patent No.: US 11,774,569 B2
(45) Date of Patent: Oct. 3, 2023

(54) OBJECT DETECTION SYSTEM WITH A SIDE COMMUNICATION CHANNEL

(71) Applicant: Aptiv Technologies Limited, St. Michael (BB)

(72) Inventors: Waldemar Dworakowski, Cracow (PL); Marzena Banach, Puszczykowo (PL); Rafal Dlugosz, Lubon (PL)

(73) Assignee: Aptiv Technologies Limited, St. Michael (BB)

( * ) Notice: Subject to any disclaimer, the term of this patent is extended or adjusted under 35 U.S.C. 154(b) by 215 days.

(21) Appl. No.: 17/396,425

(22) Filed: Aug. 6, 2021

(65) Prior Publication Data

US 2022/0043134 A1 Feb. 10, 2022

(30) Foreign Application Priority Data

Aug. 7, 2020 (EP) ..................... 20190123

(51) Int. Cl.
*G01S 13/10* (2006.01)
*G01S 13/48* (2006.01)
*G01S 13/02* (2006.01)

(52) U.S. Cl.
CPC ............ *G01S 13/106* (2013.01); *G01S 13/48* (2013.01); *G01S 2013/0254* (2013.01)

(58) Field of Classification Search
CPC ........ G01S 13/106; G01S 13/48; G01S 13/87; G01S 13/931; G01S 2013/0254; G01S 7/4004

See application file for complete search history.

(56) References Cited

U.S. PATENT DOCUMENTS

| 7,515,091 B2 | 4/2009 | Meyers et al. |
| 2002/0003488 A1 | 1/2002 | Levin et al. |

(Continued)

FOREIGN PATENT DOCUMENTS

| CN | 1497263 A | 5/2004 |
| CN | 104278907 A | 1/2015 |

(Continued)

OTHER PUBLICATIONS

"Extended European Search Report", EP Application No. 20190123.8, dated Jan. 28, 2021, 10 pages.

(Continued)

*Primary Examiner* — Timothy X Pham
(74) *Attorney, Agent, or Firm* — Sawtooth Patent Group PLLC

(57) ABSTRACT

The system comprises at least two sensors of object detection that each comprise a transmitter for producing an original periodic signal, one or two antennas for transmitting the original signal and, after the original signal has been reflected off the object, receiving a reflected signal, and a receiver for detecting an information related to the object using the received reflected signal, wherein the transmitting antenna has a radiation pattern including a main lobe and side lobes at various angles, characterized in that the two sensors have respective coverage areas that overlap, and the transmitter of one of the two sensors, that is the transmitter sensor, encodes data to be transmitted to the other one of the two sensors, that is the receiver sensor, by modulating the original signal radiated by the transmitting antenna of the transmitter sensor.

20 Claims, 2 Drawing Sheets

(56) References Cited

U.S. PATENT DOCUMENTS

| | | | |
|---|---|---|---|
| 2007/0179712 | A1 | 8/2007 | Brandt et al. |
| 2008/0211708 | A1 | 9/2008 | Haberland et al. |
| 2018/0084105 | A1 | 3/2018 | Hiscock et al. |
| 2019/0369232 | A1* | 12/2019 | Yu .......................... G01S 13/04 |

FOREIGN PATENT DOCUMENTS

| | | |
|---|---|---|
| CN | 105743542 | 7/2016 |
| CN | 107367841 A | 11/2017 |
| CN | 108983155 A | 12/2018 |
| CN | 111422219 A | 7/2020 |

OTHER PUBLICATIONS

"Foreign Office Action", CN Application No. 202110659215.4, dated Oct. 27, 2022, 14 pages.
"Foreign Office Action", EP Application No. 20190123.8, Mar. 23, 2023, 6 pages.

* cited by examiner

OBJECT DETECTION SYSTEM WITH A SIDE COMMUNICATION CHANNEL

CROSS-REFERENCE TO RELATED APPLICATION

This application claims priority to European Patent Application Number 20190123.8, filed Aug. 7, 2020, the disclosure of which is hereby incorporated by reference in its entirety herein.

BACKGROUND

The present disclosure relates to the field of object detection system. Such a system can be used for example in a vehicle.

A vehicle can be equipped with multiple sensors such as radar sensors, LIDAR sensors and image sensors, sensing the environment of the vehicle, and multiple safety related devices. All these components need to communicate with each other. Generally, the vehicle comprises an internal communications network like a CAN (Controller Area Network) bus that interconnects the components, typically with cable connections.

In a long vehicle and/or in a vehicle comprising two detachable parts like a truck having a tractor and a trailer, the use of cables to connect a sensor mounted on the trailer to the internal communications network located within the tractor is complicated and may not be reliable. Indeed, in such case, only a limited number of wires can be distributed between tractor and the trailer and the risk of cabling failure is important.

A known solution consists in providing a wireless communication means between the sensor mounted on the trailer and the internal communications network of the tractor. There exist wireless trailer mounted cameras. However, these cameras do not provide very reliable transmissions, for example when the radio 2.4 GHz or 5 GHz bands (also used in Wi-Fi communications) are used, due to interferences with other systems. Another issue is the large delays that appear when the Wi-Fi communication is used, that may cause a delay in video stream.

There is a need to improve the situation. In particular, there is a need to reduce the cabling for example between the tractor and the trailer of a vehicle like a truck equipped with detection object sensors.

SUMMARY

The present disclosure concerns an object detection system comprising at least two sensors of object detection that each comprise a transmitter for producing an original periodic signal, one or two antennas for transmitting the original signal and, after the original signal has reflected off the object, receiving a reflected signal, and a receiver for detecting an information related to the object using the received reflected signal, wherein the transmitting antenna has a radiation pattern including a main lobe and side lobes at various angles, characterized in that the two sensors have respective coverage areas that overlap, and the transmitter of one of the two sensors, that is the transmitter sensor, encodes data to be transmitted to the other one of the two sensors, that is the receiver sensor, by modulating the original signal radiated by the transmitting antenna of the transmitter sensor.

The "original" signal refers to the signal that is initially emitted (radiated at various angles) by the transmitter sensor of object detection. The "reflected" or "returned" signal refers to the signal that is reflected off the object.

The present disclosure originates from a problem of establishing a communication between a sensor of object detection, mounted on the trailer of a vehicle like a truck, and the main vehicle's network located within a tractor part of the vehicle, but applies to many other configurations of an object detection system including at least two sensors of object detection.

According to the present disclosure, the signal radiated at various angles by one of the two sensors is modulated to include the data to be transmitted to the other sensor. The other sensor can receive side lobes of the original signal modulated radiated by the transmitting antenna of the transmitter sensor and decode the received signal by demodulation to obtain said data. The original signal radiated by the transmitter sensor is used as a carrier signal to transmit data to the receiver sensor. This carrier signal is modulated by the data to be transmitted.

The transmitting antenna, typically a directional antenna, is designed to radiate most of its power in one lobe, called the main lobe, directed in a desired direction. The other lobes, called "side lobes", generally represent unwanted radiation in other directions. In the technical field of antenna, side lobes or "sidelobes" are the lobes (local maxima) of the far field radiation pattern of the antenna (or other radiation source), that are not the main lobe. The present disclosure uses these side lobes to transmit data from one sensor to the other sensor. This allows to provide a side communication channel between the two sensors of object detection. This side communication channel can be used to transfer data like sensor data, or any other type of data. Furthermore, such a communication between the two sensors can be achieved by energy harvesting, using part of the power radiated by the transmitter sensor.

Advantageously, the two sensors are disposed so that the receiving antenna of the receiver sensor can receive the side lobes radiated by the transmitting antenna of the transmitter sensor within an angular range. In other words, the relative positions of the two sensors are such that one sensor can receive the side lobes radiated by the other sensor within an angular range.

The transmitter of the transmitter sensor can modulate the original signal by varying at least one property of the group including a frequency, a phase and an amplitude of the original signal. For example, the transmitter of the transmitter sensor can encode the data by frequency modulation, typically by modulating the transmission frequency of the signal radiated (i.e., emitted according to a radiation pattern having a main lobe and side lobes) by the transmitter sensor.

In a first embodiment, the transmitter sensor transmits the original signal modulated between two successive operations of object detection performed by the transmitter sensor. Thus, the transmitter sensor transmits data to the receiver sensor when object detection is not performed. In this embodiment, the transmitter sensor can perform object detection, such as a range measurement, by emitting a signal having a normal transmission frequency (not modified). The transmitter sensor can alternatively perform object detection (e.g. range measurement) and transmission of data to the receiver sensor, for example at predetermined successive periods of time.

Advantageously, the receiver sensor concomitantly receives the original signal modulated between two successive operations of object detection. The transmitter sensor and the receiver sensor are advantageously synchronized to transmit and receive data at the same time.

In a second embodiment, the transmitter sensor modulates the original signal and radiates the original signal modulated, while using said original signal modulated to concomitantly perform object detection. In this embodiment, the transmitter sensor concomitantly performs object detection and transmission of data by radiating a modulated signal.

The two sensors of object detection can be radar sensors. The two sensors of object detection can be other sensors, or a combination of radar and other sensors.

The object detection system can further comprise a controller that controls the sensors of object detection. Only one of the two sensors of object detection can be connected to the controller with a connection link, such as a cable, and the two sensors can be arranged so that communication between the non-connected sensor and the controller is achieved through a communication between the two sensors.

The object detection system can further comprise one or more other components connected to the non-connected sensor with a connection link, that can communicate with the controller by using the communication between the two sensors of object detection. The other component(s) can include other sensor(s).

The present disclosure also concerns a sensor of objection detection, suitable to be used in the system defined above, comprising a transmitter for producing an original periodic signal, one or two antennas for transmitting the original signal and, after the original signal has reflected off the object, receiving a reflected signal, and a receiver for detecting an information related to the object using the received reflected signal, wherein the transmitting antenna has a radiation pattern including a main lobe and side lobes at various angles, characterized in that the transmitter encodes data to be transmitted to another object detection sensor by modulating the original signal radiated by the transmitting antenna.

The receiving antenna can be arranged to receive a signal and the receiver can be arranged to decode the received signal by demodulation to obtain data encoded within the received signal.

The present disclosure further concerns a vehicle comprising the object detection system as previously defined.

The vehicle can comprise a tractor and a trailer. The tractor can comprise one of the two sensors and the trailer can comprise the other sensor. The sensor of the tractor can be a connected sensor, and the sensor of the trailer can be a non-connected sensor.

Optionally, the vehicle comprises two pairs of object detection sensors, respectively disposed on the left and right sides of the vehicle with respect to the forward direction of travel of the vehicle. In this particular implementation, the two pairs of sensors are used in parallel (one on each side of the vehicle). Such a configuration provides an unbreakable communication, even when the vehicle turns left or right and causes that the respective coverage areas of the two coupled sensors do not overlap temporarily.

The present disclosure also concerns a method of communication between two sensors of object detection, wherein the two sensors have respective coverage areas that overlap, each sensor comprises a transmitter for producing an original periodic signal, at least one antenna for transmitting the original signal and, after the original signal has reflected off the object, receiving the reflected signal, and a receiver for detecting an information related to the object using the received reflected signal, the at least one antenna having a radiation pattern including a main lobe and side lobes at various angles, the method comprising the following steps, performed at one of the two sensors, that is the transmitter sensor: encoding, by the transmitter, data to be transmitted to the other one of the two sensors, that is the receiver sensor, by modulating the original signal, and radiating, by the transmitting antenna, the original signal modulated and including the encoded data.

The receiver sensor can receive the original signal modulated by receiving side lobes radiated by the transmitting antenna of the transmitter sensor and decodes the received signal by demodulation to obtain said data.

In case that only one of the two sensors is connected to a controller with a connection link, a communication between the non-connected sensor and the controller can be achieved through a communication between the two sensors.

BRIEF DESCRIPTION OF THE DRAWINGS

Other features, purposes and advantages of the disclosure will become more explicit by means of reading the detailed statement of the non-restrictive embodiments made with reference to the accompanying drawings.

DETAILED DESCRIPTION

A vehicle has a plurality of automotive electronic systems, that are distributed systems, classified for example as engine electronics, transmission electronics, chassis electronics, passive safety, driver assistance, passenger comfort, entertainment systems, electronic integrated cockpit systems. Sensors are components of these automotive electronic systems.

For use in these automotive electronic systems, there are many types of sensors. There are in particular sensors of object detection that can be used for range measurement to the object, detection of an obstacle, detection of a property of the object like its speed, acceleration, or others, etc. . . . . . Typically, in a vehicle, the sensors of object detection can be cameras, radar sensors or LIDAR sensors. The vehicle can have a plurality of sensors of object detection that need to communicate with a controller (or possibly several controllers), such as an electronic control unit (ECU), having the function of controlling the sensors. The sensors may be located near the ECU or remote from the ECU. In the first case, the sensors can be easily connected to the ECU using a link connection like a cable, typically through an internal communications network like a CAN (Controller Area Network) bus. In the second case, it might be difficult or not convenient to connect the remote sensor(s) to the ECU using a connection link like a cable. The present disclosure allows to establish a communication between the controller and the one or more remote sensors without connection link a cable.

Figure 1:
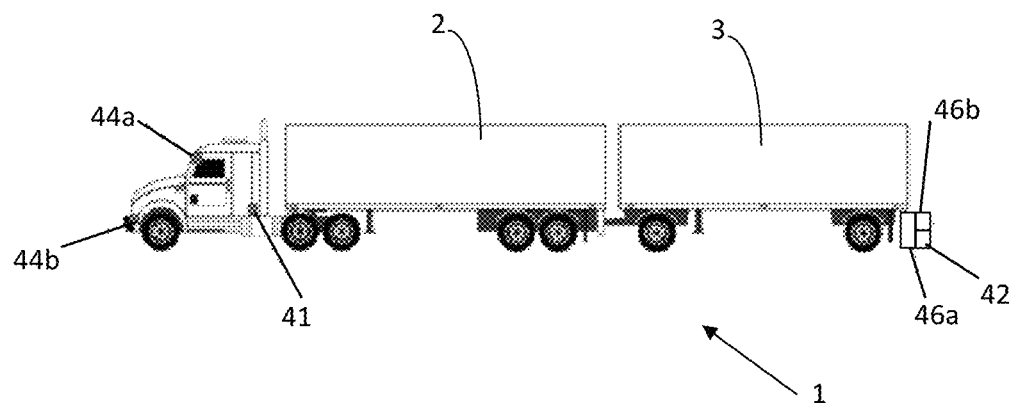
FIG. 1 shows a vehicle including multiple sensors.
Figure 2:
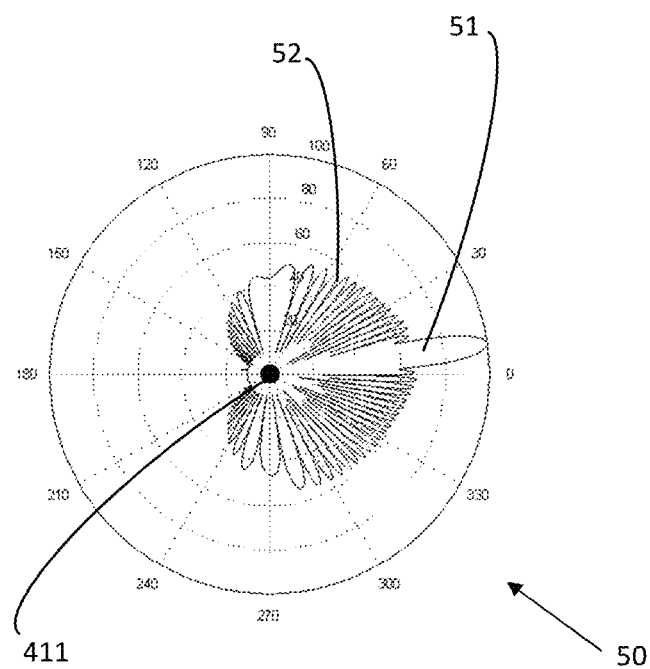
FIG. 2 shows an example of a radiation pattern of an antenna of a radar sensor.

The present disclosure concerns more particularly an object detection system 4, suitable to be used within a vehicle (for example the vehicle 1 in FIG. 1), having at least two sensors of object detection 41, 42 that each have: a transmitter 410, 420 for producing an original periodic signal (having a determined transmission frequency), such as a signal in the form of successive pulses or of any waveform; one or two antennas for transmitting the original signal and, after the signal has reflected off an object, receiving the reflected (or returned) signal (i.e., either one transmitting and receiving antenna 411, 421, or one transmitting antenna and one receiving antenna), and a receiver 412, 422 for detecting the object using the received reflected signal, wherein the transmitting antenna 411, 421 has a radiation pattern including a main lobe 51 and side lobes 52 at various angles, as represented in FIG. 2.

In the present disclosure, the terms "transmitting antenna" mean a radiation source designed to radiates waves such as electromagnetic waves. The terms "receiving antenna" mean a radiation receptor designed to receive these waves. A transmitting and receiving antenna is a device that is both a radiation source and a radiation receptor.

In each sensor 41, 42, the transmitting antenna 411, 421 is a directional antenna that is configured to emit a signal of electromagnetic waves in one particular direction. More precisely, the antenna 411, 421 is designed to radiate most of its power in one lobe directed in a desired direction. This lobe is called the "main lobe" 51. The other lobes, called "side lobes" 52, represent unwanted radiation in other directions. The side lobes can include a back lobe (not represented in FIG. 2) that is a side lobe directly behind the main lobe. In the radiation pattern, the main lobe 51 is larger than the side lobes 52. The axis of maximum radiation passes through the center of the main lobe 51.

In the illustrative example of FIG. 2, the antenna 411 (or 421) corresponds to the center of the polar radiation plot represented and the axis of maximum radiation has an angle around 7.5° with respect the direction 0°. The main lobe 51 occupies an angular range between 0° and 15° and the sides lobes extend over a first angular range from 15° to 150° and a second angular range from 210° to 360°. Other configurations are possible. The example of FIG. 2 is only an illustrative and non-limitative example.

The two sensors 41, 42 are for example radar sensors. But other types of sensors (LIDAR, ultra-sound, etc.) could be used.

The two sensors 41, 42 have respective coverage areas that overlap to allow communication between the two sensors. In other words, the coverage area of the transmitter sensor 41 covers part of the coverage area of the receiver sensor 42. The two sensors 41, 42 are disposed so that the receiving antenna 421 of the receiver sensor 42 can receive at least the side lobes radiated by the transmitting antenna 411 of the transmitter sensor 41 within an angular range $\Omega$. To achieve a bidirectional communication between them, the two sensors 41, 42 are disposed so that each sensor can receive at least the side lobes radiated by the other sensor within a respective angular range $\Omega_1$, $\Omega_2$.

A side communication channel between the two sensors of object detection 41, 42 can be established to transmit data from one sensor to the other sensor, using some lobes of the radiation pattern of the transmitting antenna, typically side lobes. For the purpose of illustration, let's assume that the sensor 41 is the transmitter sensor and the sensor 42 is the receiver sensor. A transmission of data in the other direction, from the sensor 42 to the sensor 41, could be done in the same way.

The transmitter 410 of the transmitter sensor 41 produces an original periodic signal having a transmission frequency and encodes the data to be transmitted by modulating this original signal 5. The signal can be modulated by frequency modulation, as explained below The transmitter sensor 41 is normally used to perform object detection. In a use case of objection detection, the original signal produced by the transmitter 410 has a given transmission frequency. In the present disclosure, the transmitter sensor 41 can be used to transmit data to the receiver sensor 42. In that case, the transmitter 410 modulates the original signal by modulating its transmission frequency depending on the data to be transmitted. In other words, the transmission frequency of the original signal produced and radiated by the transmitter sensor 41 is modulated depending on the data to be transmitted, so that the radiated original signal includes the encoded data. The transmitting antenna 411 of the transmitter sensor 41 then emits the modulated original signal with a radiation pattern 50 that includes a main lobe 51 and side lobes 52 at various angles, as shown in FIG. 2. The signal 5 radiated in various angles includes the encoded data (modulating the transmission frequency of the radiated signal).

Depending on the relative positions of the two sensors of object detection 41 and 42 (i.e., depending on how the respective coverage areas of the two sensors 41, 42 overlap), the receiving antenna 421 of the receiver sensor 42 receives at least a part of the side lobes 52 of the signal 5 (modulated) radiated by the transmitting antenna 411. In a particular embodiment, the receiving antenna 421 can receive only the side lobes 52 of the signal radiated by the antenna 411 at angles within an angular range $\Omega_1$, for example between 60° and 150°, or more precisely between 90° and 120° (as represented in FIG. 2). Then, the receiver 422 of the receiver sensor 42 processes the received signal including the received side lobes of the signal to determine the transmitted data by demodulation.

In a first embodiment, the transmitter sensor 41 transmits the original signal modulated, including the encoded data, between two successive operations of object detection performed by the transmitter sensor 41. The receiver sensor 42 concomitantly receives the original signal modulated, including the encoded data, between two successive operations of object detection. In other words, the transmitter sensor 41 and the receiver sensor 42 respectively transmit and receive the signal at the same time between successive operations of object detection. For example, the transmitter sensor 41 and the receiver sensor 42 can perform object detection and transmission/reception of data alternatively during predetermined successive periods of time, and be synchronized to perform concomitantly transmission and reception of the data, during the same predetermined periods of time.

A second embodiment of the object detection system 4 is based on the first embodiment and only differs from it by the features described below.

In the second embodiment, the transmitter sensor 41 is configured to concomitantly performs object detection and transmission of data to the receiver sensor 42. The receiver sensor 42 is also configured to concomitantly perform object detection and reception of data from the transmitter sensor 42.

In that case, the transmitter sensor 41 modulates the original signal and radiates the original signal modulated (including the encoded data to be transmitted), while using this original signal modulated to concomitantly perform object detection. In operation, the transmitter 410 produces a signal 5 for object detection and modulates this signal 5 to include the data to be transmitted. More precisely, the transmitter 410 modulates the transmission frequency of the original signal and the antenna 411 radiates the original signal modulated, including the encoded data, at various angles.

The original signal modulated is reflected by an object and the returned signal (from the original signal modulated) is received and processed by the receiver 412 of the sensor 41 to detect an information related to the object. In the processing, the receiver 412 takes into account the modulation applied to the original signal that has been emitted.

A third embodiment of the object detection system is based on the first or second embodiment.

In the third embodiment, the object detection system further comprises a controller, such as an ECU, that controls the sensors of object detection 41, 42.

Only one of the two sensors of object detection, for example the sensor 41, is connected to the controller 43 through a connection link, such as a cable. The connection link can connect the sensor to an internal communications network 45, like a CAN bus, that interconnects a plurality of components including the controller 43 and other components 44a-44d, for example other object detection sensors (such as camera(s), LIDAR sensor(s), other radar sensor(s)) and/or other electronic or electrical devices.

The other sensor of object detection 42 is a non-connected sensor. For example, the connected sensor 41 is located near the controller 43 and can easily be connected to it with a cable, and the non-connected sensor 42 is located remote to the controller 43.

The connected sensor 41 and the non-connected sensor 42 are arranged so that communication between the non-connected sensor and the internal communications network can be achieved as previously described in the first or second embodiment. That is, the communication of data between the connected sensor 41 and the non-connected sensor 42 can be achieved by modulating the signal radiated by the transmitting antenna 421 of the non-connected sensor 42 to transmit data from the non-connected sensor 42 to the controller 43, and by modulating the signal radiated by the transmitting antenna 411 of the connected sensor 41 to transmit data from the controller 43 to the non-connected sensor 42.

A fourth embodiment is based on the third embodiment and only differs from it by the following features.

Figure 3:
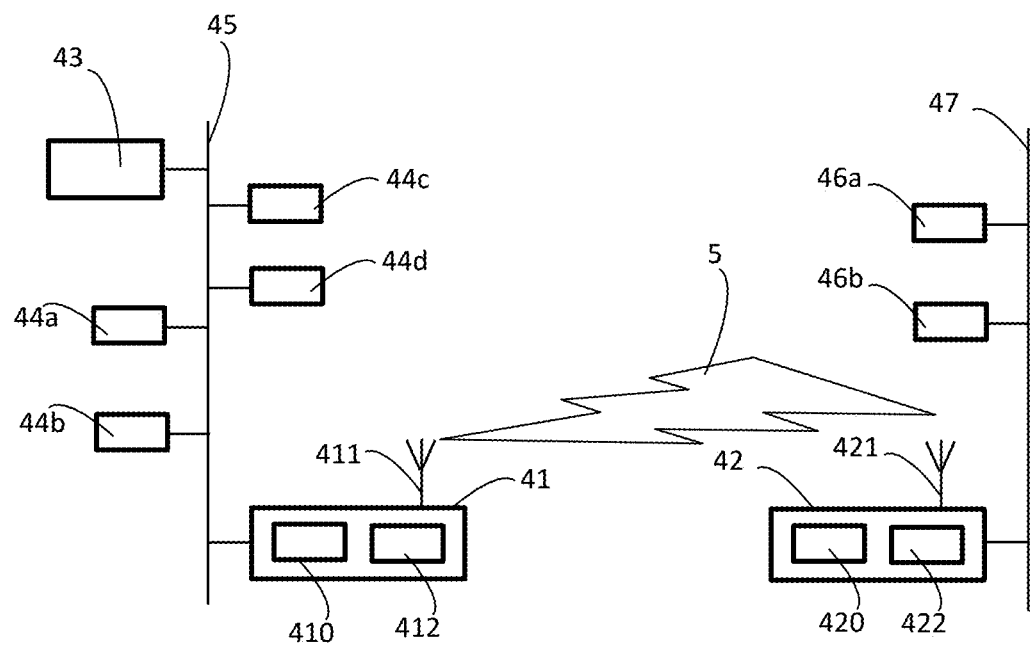
FIG. 3 shows schematically a system comprising a plurality of components, the object detection system according to any of claims 1 to 8, and an internal communications network that interconnects the components for displaying application contents on different display devices, according to an exemplar embodiment.
Figure 4:
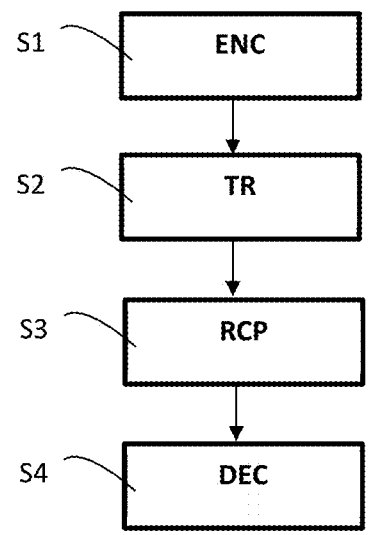
FIG. 4 is a flowchart of a method of transmitting data between two sensors of object detection, according to a particular embodiment.

In the fourth embodiment, the object detection system 4 comprises at least one other sensor connected to the non-connected sensor with a connection link. In other words, one or more other sensors, such as the sensors 46a, 46b in FIG. 3, are connected to the non-connected sensor 42 with a connection link such as a cable. The non-connected sensor 42 and the other sensor(s) 46a, 46b can be interconnected by a local communications network 47 like a CAN bus. This local communications network 47 is a secondary network, while the communications network 45 to which the controller is connected is a main network. For example, the other sensors 46a, 46b can include camera(s), LIDAR sensor(s), or any other type of sensor (e.g., temperature sensor, etc.).

The other sensors 46a, 46b can communicate with the controller 43 by using the communication between the connected sensor 41 and the non-connected sensor 42, as previously described for example in the first, second or third embodiment.

In a variant of the fourth embodiment, the object detection system comprises at least one other component connected to the non-connected sensor with a connection link. These other component(s) can include component(s) other than sensor(s). They can communicate with the controller 43 by using the communication between the connected sensor 41 and the non-connected sensor 42, as previously described for example in the first, second or third embodiment.

The present disclosure also concerns a vehicle 1 having an object detection system 4 according to one of the first, second, third or fourth embodiment, or the variant of the fourth embodiment.

FIG. 1 shows an example of a vehicle 1 that is a truck comprising a tractor 2 and a trailer 3. The tractor 2 comprises one of the two sensors of object detection, for example the sensor 41, and the trailer 3 comprises the other sensor of object detection 42.

In case that the vehicle 1 has the object detection system 4 according to the third embodiment, or the fourth embodiment or the variant of the fourth embodiment, the tractor 2 has the sensor 41 connected to the controller 43 and the trailer 3 has the sensor 42 non-connected to the controller.

The tractor 2 can have an embedded system that has a plurality of components 43, 44a-44d, 41 and an internal communications network 45 interconnecting these components, such as a CAN bus.

The connection link between the connected sensor and the controller (or the internal communications network to which the controller is connected), could be other than a cable. For example, it could be a wireless connection link using a standardized wireless communication protocol. The same applies for the connection link between the non-connected sensor 42 and the secondary communications network 47.

The present disclosure also concerns a method of transmitting data between the two sensors of object detection 41, 42, comprising a first step of encoding S1, by the transmitter 410 of the transmitter sensor 41, the data to be transmitted to the receiver sensor 42, by modulating the ('original') signal produced by the transmitter 411. As previously described, the modulation can be a frequency modulation such as a modulation of the transmission frequency of the radiated signal. More precisely, the signal has pulses emitted with given frequency that is modulated depending on the data to be transmitted.

In a second step of transmission S2, the transmitter sensor 41 radiates the modulated signal including the encoded data with the transmitting antenna 411 at various angles, according to its radiation pattern (including a main lobe 51 and side lobes 52) as previously described. The transmission can be achieved as described in the first embodiment or the second embodiment.

In a third step of reception S3, the receiver sensor 42 receives side lobes of the modulated signal, which are radiated by the transmitting antenna 411 within an angular range of radiating angles (for example between 60° and 150°, or between 90° and 120°, in FIG. 2), using its receiving antenna 421.

In a fourth step of decoding S4, the receiver 422 of the receiver sensor 42 decodes the received signal by demodulation and obtains the transmitted data.

In case that only one of the two sensors 41 is connected to the controller 43 with a connection link, a communication between the non-connected sensor 42 and the controller 43 is achieved through a communication between the two sensors 41, 42. In the same way, a communication between another component (sensor or other) connected to the non-connected sensor 42 (but not connected to the controller 43) and the controller 43 is achieved through a communication between the two sensors 41, 42.

In a variant, the vehicle 1 comprises two pairs of sensors of object detection 41, 42, one on each side of the vehicle. More precisely, the vehicle 1 comprises a first pair of sensors of object detection 41, 42 on the right side of the vehicle 1 and a second pair of sensors of object detection 41, 42 on the left side of the vehicle, the left and right sides being defined with respect to a forward direction of travel of the vehicle 1. The use of two pairs of sensors of object detection, each capable of establishing a side communication channel between the two sensors, allows to provide two side communication channels, one on each side of the vehicle. Such a configuration allows to avoid a loss of communication in case that the two sensors of one of the two side communications channel have coverage areas that do not overlap temporarily due to a turn maneuver of the vehicle or a turn on a road that is not straight. It may happen that the communication between two paired sensors is lost temporarily, due to some particular circumstances, but, in such a situation, the communication between the two other paired sensors is maintained.

In another variant, the vehicle 1 comprises N pairs of sensors of object detection capable of establishing N side communication channels, with N>2.

In the described embodiments, the data to be transmitted are encoded by frequency modulation of the original signal, typically by modulating the transmission frequency of the original signal radiated (i.e., emitted according to a radiation pattern having a main lobe and side lobes) by the transmitter sensor. A modulation other than frequency modulation could be used. For example, the original signal produced by the transmitter could be modulated by varying one or more properties of the group including a frequency, a phase and an amplitude of the original signal.

What is claimed is:

1. A system comprising:
a first sensor and at least one second sensor each arranged on a vehicle to perform object detection within an overlapping coverage area,
the first sensor comprising:
a transmitter configured to radiate a first periodic signal that has a radiation pattern including a main lobe for detecting objects in the coverage area, and a plurality of side lobes for exchanging data sensor-to-sensor on a side communication channel formed between the first sensor and the second sensor,
the transmitter being further configured to modulate the first periodic signal when the first periodic signal reflects off an object to encode object data relating to that object on a carrier signal that is transmitted sensor-to-sensor through the side communication channel;
the second sensor comprising:
a receiver configured to detect the carrier signal from the side lobes of the radiation pattern of the first sensor to demodulate the carrier signal and decode the object data transmitted from the first sensor.

2. The system according to claim 1, wherein the first sensor and the second sensor are disposed so that at least one antenna of the second sensor is configured to receive, within an angular range, the side lobes of the first periodic signal.

3. The system according to claim 1, wherein the transmitter of the first sensor is configured to modulate the first periodic signal by varying at least one property of a group of properties for the first periodic signal, the group including a frequency, a phase, and an amplitude.

4. The system according to claim 1, wherein the first sensor transmits the first periodic signal modulated between two successive operations of object detection performed by the first sensor.

5. The system according to claim 4, wherein the second sensor is configured to concomitantly receive the first periodic signal modulated between the two successive operations of object detection.

6. The system according to claim 1, wherein the first sensor is configured to modulate the first periodic signal and radiate the modulated first periodic signal, while using the modulated first signal to concomitantly perform object detection.

7. The system according to claim 1, wherein the first sensor and the second sensor are radar sensors.

8. The system according to claim 1, further comprising:
a controller configured to control the first sensor and the second sensor, wherein the controller is communicatively connected to the first sensor with a communication link, and the controller is communicatively connected to the second sensor using the communication link between the controller and the first sensor and further using communication between the first sensor and the second sensor.

9. The system according to claim 8, comprising at least one other component connected to the second sensor with another connection link, the at least one other component being configured to communicate with the controller using the communication between the first sensor and the second sensor.

10. The system according to claim 1, wherein the first sensor and the second sensor are sensors for an automotive system.

11. The system according to claim 1, wherein at least one antenna of the second sensor is arranged to receive the reflected signal to obtain, through demodulation of the reflected signal, data encoded therein.

12. The system according to claim 1, wherein the system is configured to perform object detection for a vehicle.

13. The system according to claim 1, wherein the system comprises a first system and a second system, the first sensor and the second sensor at least two sensors of the first system being configured to be on one side of a vehicle and the first sensor and the second sensor of the second system being configured to be on another side of the vehicle.

14. A method comprising:
communicating between a first sensor and at least one second sensor each arrange on a vehicle to perform object detection within an overlapping coverage area, the communicating comprising:
radiating, with a transmitter of the first sensor, a first periodic signal that has a radiation pattern including a main lobe for detecting objects in the coverage area, and a plurality of side lobes for exchanging data sensor-to-sensor on a side communication channel formed between the first sensor and the second sensor;
modulating, by the transmitter, the first periodic signal when the first periodic signal reflects off an object to encode object data relating to that object on a carrier signal that is transmitted sensor-to-sensor through the side communication channel; and
detecting, with a receiver of the second sensor, the carrier signal from the side lobes of the radiation pattern of the first sensor to demodulate the carrier signal and decode the object data transmitted from the first sensor.

15. The method according to claim 14, the communicating further comprising:
  receiving, by the receiver of the second sensor, the modulated first periodic signal by receiving the side lobes radiated by the first sensor; and
  decoding the data by demodulating the modulated first periodic signal received from the side lobes.

16. The method according to claim 14, further comprising performing object detection for a vehicle.

17. The method according to claim 16, wherein the first sensor and the second sensor are from a first object detection system configured to be on one side of a vehicle, the vehicle comprising a second object detection system.

18. The method according to claim 14, wherein the first sensor and the second sensor are radar sensors.

19. A non-transitory computer readable storage medium comprising instructions that, when executed, configure a controller of a system to communicate between a first sensor and at least one second sensor each arrange on a vehicle to perform object detection within an overlapping coverage area, the instructions configure the controller to communicate between the first sensor and the second sensor by:
  causing a transmitter of the first sensor to:
    radiate a first periodic signal that has a radiation pattern including a main lobe for detecting objects in the coverage area, and a plurality of side lobes for exchanging data sensor-to-sensor on a side communication channel formed between the first sensor and the second sensor; and
    modulate the first periodic signal when the first periodic signal reflects off an object to encode object data relating to that object on a carrier signal that is transmitted sensor-to-sensor through the side communication channel; and
  causing a receiver of the second sensor to detect the carrier signal from the side lobes of the radiation pattern of the first sensor to demodulate the carrier signal and decode the object data transmitted from the first sensor.

20. The computer readable storage medium according to claim 19, wherein the first sensor and the second sensor are radar sensors.

* * * * *

UNITED STATES PATENT AND TRADEMARK OFFICE
CERTIFICATE OF CORRECTION

PATENT NO. : 11,774,569 B2
APPLICATION NO. : 17/396425
DATED : October 3, 2023
INVENTOR(S) : Waldemar Dworakowski et al.

Page 1 of 1

It is certified that error appears in the above-identified patent and that said Letters Patent is hereby corrected as shown below:

In the Claims

At Column 10, Claim 13, Line 40, after "second sensor", delete "at least two sensors".

At Column 11, Claim 17, Line 13, delete "system." and insert --system configured to be on another side of the vehicle.--.

Signed and Sealed this
Fifteenth Day of April, 2025

Coke Morgan Stewart
*Acting Director of the United States Patent and Trademark Office*